(12) United States Patent
Bosgieter et al.

(10) Patent No.: US 6,494,484 B2
(45) Date of Patent: *Dec. 17, 2002

(54) POLYGON-SHAPED AIR BAG

(75) Inventors: Lance M. Bosgieter, Roy, UT (US); Ramesh Keshavaraj, LaGrange, GA (US)

(73) Assignee: Milliken & Company, Spartanburg, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/298,281

(22) Filed: Apr. 23, 1999

(65) Prior Publication Data
US 2001/0020779 A1 Sep. 13, 2001

(51) Int. Cl.[7] .................................................. B60R 21/16
(52) U.S. Cl. ..................................... 280/743.1; 280/731
(58) Field of Search .......................... 280/743.1, 728.1, 280/731, 730.2, 730.1

(56) References Cited

U.S. PATENT DOCUMENTS

| | | | | |
|---|---|---|---|---|
| 2,335,292 A | * | 11/1943 | Messenger | |
| 4,603,571 A | * | 8/1986 | Wessels | |
| 5,454,589 A | * | 10/1995 | Bosio et al. | 280/729 |
| 5,720,234 A | * | 2/1998 | Hammer | 280/743.1 |
| 5,865,464 A | * | 2/1999 | Kanuma et al. | 280/743.1 |
| 5,957,486 A | * | 9/1999 | Taguchi et al. | 280/729 |
| 5,975,571 A | * | 11/1999 | Ford et al. | 280/743.1 |

* cited by examiner

Primary Examiner—Kenneth R. Rice
Assistant Examiner—Lynda Jasmin
(74) Attorney, Agent, or Firm—Terry T. Moyer; George M. Fisher

(57) ABSTRACT

A polygon-shaped air bag comprised of fabric for use in vehicle restraint systems is disclosed. The air bag is constructed from fabric panels in the shape of congruent, n-sided equiangular polygons, where n may be between five and eleven, but is preferably six or eight. The individual panels may be in the form of a single polygon, or in the form of two abutting polygons. The use of polygon-shaped panels allows for economical fabric utilization and increased fabrication efficiency, compared with panels having a circular shape.

12 Claims, 4 Drawing Sheets

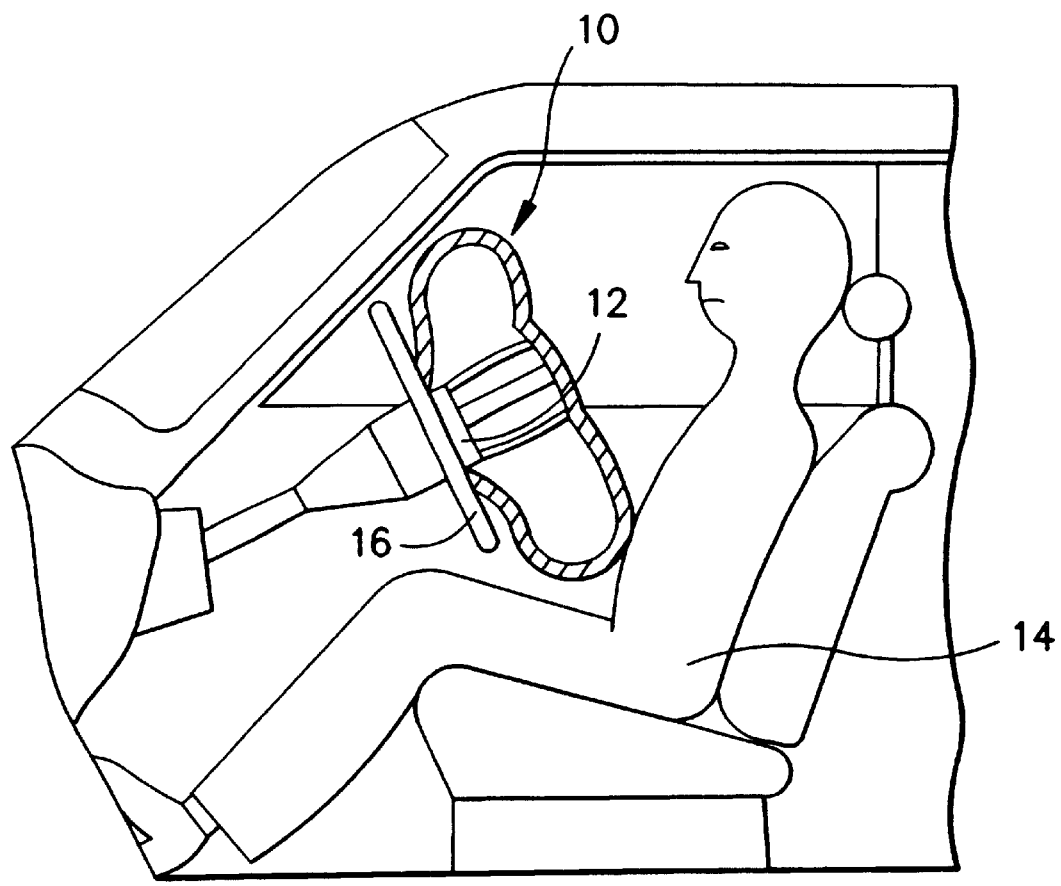
FIG. -1-

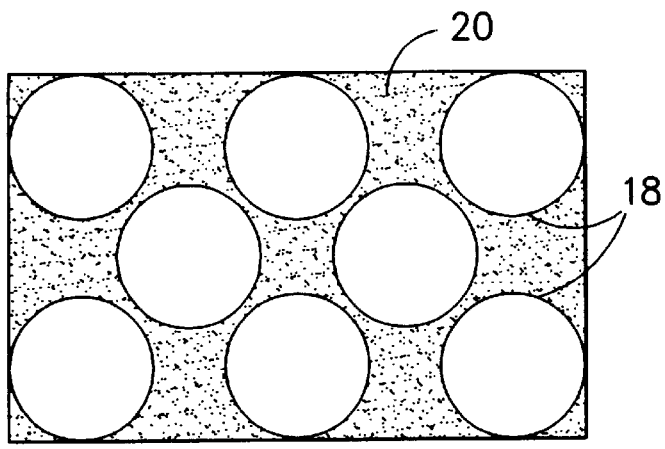
FIG. -2-
PRIOR ART
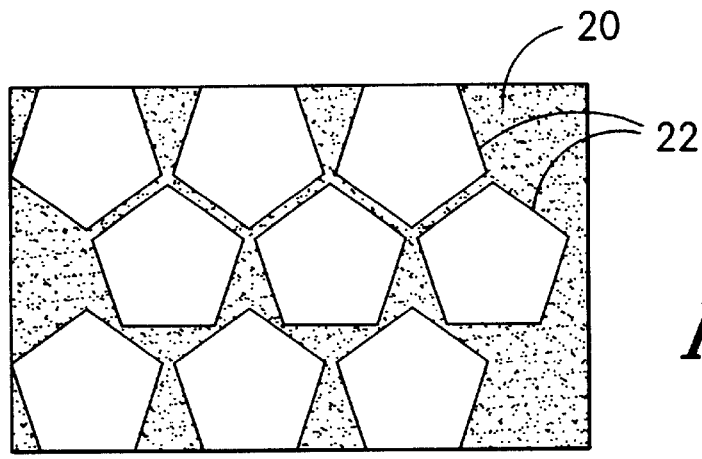
FIG. -3-
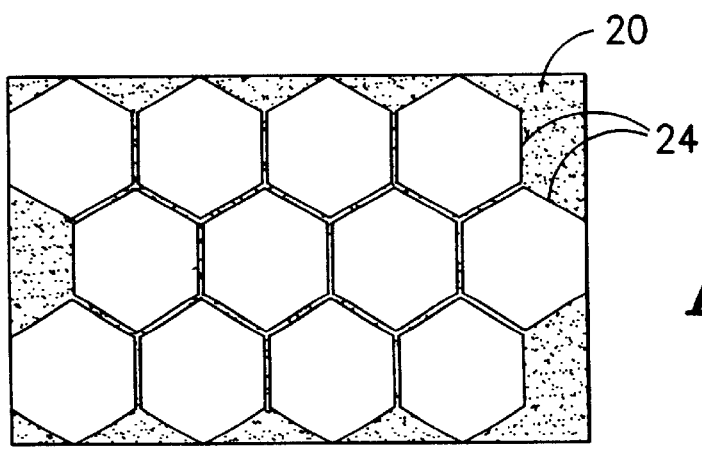
FIG. -4-

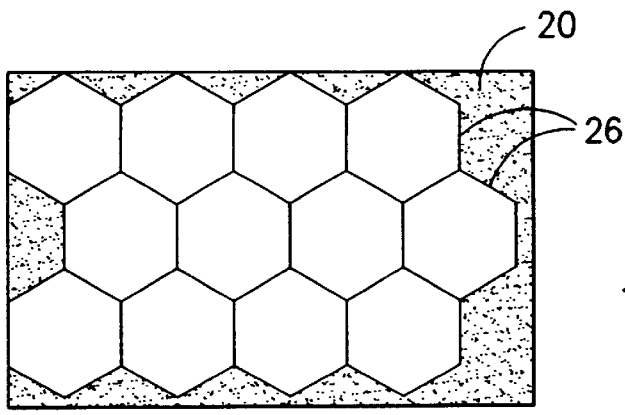
FIG. -4A-
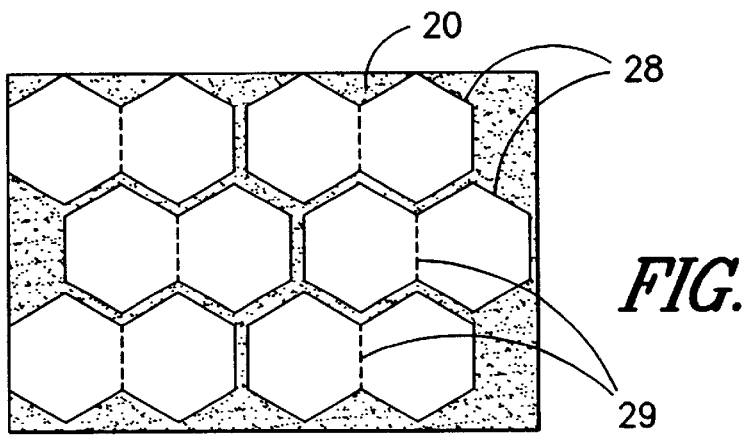
FIG. -4B-
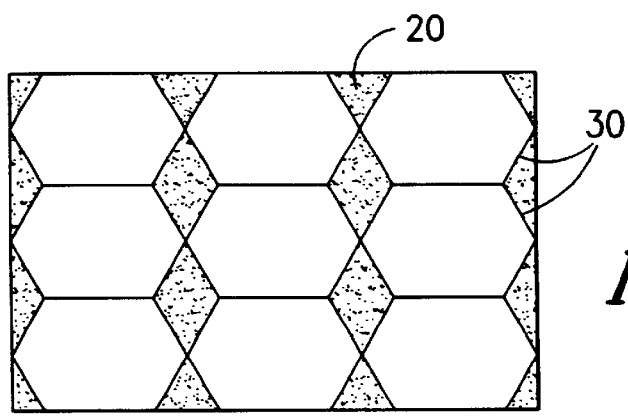
FIG. -5-

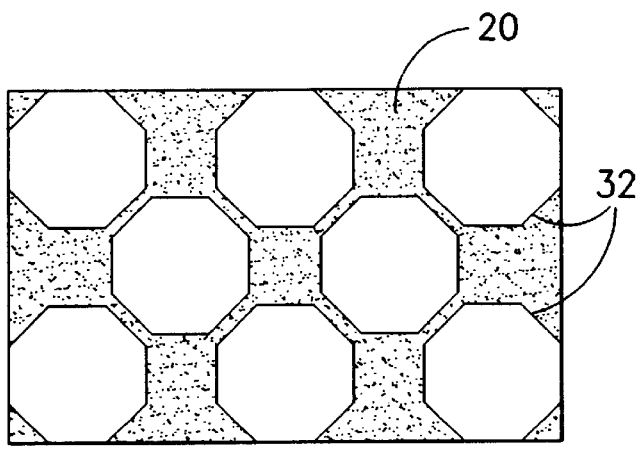
FIG. -6-
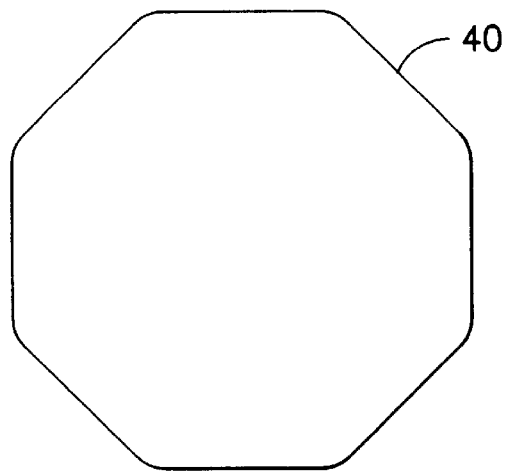
FIG. -7-

POLYGON-SHAPED AIR BAG

FIELD OF THE INVENTION

The present invention relates generally to inflatable cushions used in vehicle occupant restraint systems. More particularly, this invention relates to a cushion constructed from fabric in the form of two congruent equiangular polygons that may or may not share a common side and that, during the construction process, are superimposed in congruent fashion and joined along their respective coincident edge portions to form a polygon-shaped cushion.

BACKGROUND OF THE INVENTION

An inflatable restraint cushion, or air bag, plays an important role in protecting the occupants of a vehicle from injury due to collision against the car body. Typically, the air bag is disposed within a supporting structure such as a dash panel, steering wheel, door panel, or other fixed portion of a car body in opposed or adjacent relationship to a seat in the vehicle. When inflated rapidly by the pressure of a reaction gas released from an inflator during a collision, the air bag serves as a protective barrier between the vehicle occupant and the steering wheel or other portion of the vehicle body against which the occupant might otherwise be thrown.

Air bags have been used in the past to protect both the vehicle operator and vehicle passengers. Systems for the protection of the vehicle operator are typically mounted in the steering column of the vehicle and utilize cushion constructions that deploy directly towards the driver. These driver-side air bags can be of a relatively simple configuration in that they function over a small, well-defined area between the driver and the steering column. Typically, driver-side air bags are circular or substantially circular in shape when viewed from the front or the back. Such circular air bags are frequently constructed by superimposing, aligning, and joining, along their respective coinciding edges, two generally circular fabric sections that are separately cut from a web or blank of air bag fabric. While such circular air bags are functionally effective, the circular shape of the front and back fabric sections or panels from which the air bags are constructed does not lend itself to the efficient utilization of fabric during the manufacturing process. Specifically, the arrangement of these circular pieces or panels on a given blank of air bag fabric does not result in efficient fabric utilization or yield. Fabric is wasted in producing such circular cushions since the circular templates do not have straight edges which can be aligned with the edges of the fabric blank or which can be juxtaposed in close proximity on the fabric to provide common or nearly common adjacent edges with minimal fabric waste between neighboring cut sections. Furthermore, because use of circular or other curved panels frequently results in oddly-shaped sections of fabric between neighboring cut panels, utilizing such inter-panel fabric to make other necessary parts of the air bag (e.g., various reinforcements, etc.) is often difficult.

As used herein, it is intended that the following terms be defined as indicated: The term "polygon" is a plane geometric figure having n sides and n vertices. An equiangular polygon is a polygon in which all the angles comprising the vertices are equal. A regular polygon is an equiangular polygon in which all sides are of equal length. A convex polygon is one for which no side, if extended, will enter the polygon. Unless otherwise specified, the term "polygon" shall refer to a convex, equiangular polygon. The term "congruent" shall be used to mean capable of being superimposed so as to have a perimeter that is coincident throughout. The term "fabric" shall be used in a broad sense to describe any woven or non-woven fabric, film, polymer, combinations or composites thereof, or other suitable material from which the individual panels comprising an air bag may be constructed.

It is common, particularly in air bags designed for the protection of vehicle drivers, to find such air bags fabricated from the seaming or joining of two similarly-dimensioned circular panels along their respective perimeter edges after such circular panels have been cut from a blank of suitable air bag fabric and superimposed in congruent fashion. The instant invention provides for the use of relatively simple polygonal starting geometries for the fabric panels in order to reduce air bag fabric waste by reducing the quantity of fabric between the panels on a fabric blank. Additionally, fabric waste may be reduced because, when such polygons are used, the inter-panel fabric (which might otherwise have to be discarded when circular panels are used) tends to have a straight-sided shape from which the fabrication of other components needed for air bag construction (e.g., reinforcements and the like) may be more easily constructed, thereby saving on the area of uncut fabric blank that must be used in the construction process.

It has been found that fabric utilization can be significantly improved by substituting polygon shapes, and particularly equiangular polygons having n sides, where n is at least five, for the circular-shaped panels of the prior art. In one preferred embodiment, two such panels are individually cut and the cushion is constructed by superimposing the panels in congruent fashion (i.e., with coincident edges) and joining each of the n sides of one of the polygon-shaped panels to the respective coincident $n^{th}$ side of the other panel. In another preferred embodiment, a single panel is cut in the form of a pair of abutting, congruent n-sided equiangular polygons that share a common uncut side, i.e., a single, dual-lobed panel, having a perimeter comprised of 2n−2 sides, in which each lobe resembles an n-sided polygon having n−1 cut edges. This single piece panel may be folded about an axis that coincides with the shared uncut side to allow the lobes to be superimposed in congruent fashion. By joining the respective n−1 coincident cut edges, a polygonal cushion similar to the two-panel cushion of the first embodiment may be formed, but without the need for a joining operation along the shared side due to the lack of any cut edge.

The polygon shapes can be placed in close proximity to one another on the fabric blank from which they are cut, thus minimizing fabric waste and cost, and providing a useful advancement over the present art. The fabric between polygon-shaped panels (the inter-panel fabric) tends to have straight sides and is therefore easier to utilize in the manufacture of other air bag components (e.g., reinforcements or other components). The advantages of the present invention include better fabric utilization and an overall simplification of the manufacturing process. By providing congruent polygonal fabric panels having linear edge segments, this invention facilitates seaming operations by improving in the ease, effectiveness, and efficiency with which the cut pieces can be aligned and joined during the seam formation process. Prior designs tend either to result in relatively poor material utilization due to the use of unusual panel shapes or to require more complex aligning, folding or sewing operations during the seaming process than is found in the instant invention. Accordingly, cost is lowered due to the improved yield per fabric blank as well as the increased efficiency with which the cutting and joining operations can be performed.

All of these advantages apply to the embodiment using two separate n-sided congruent polygon panels as well to the embodiment using a single, dual-lobed panel, with congruent lobes in the shape of the same n-sided polygon. However, an additional advantage of the latter embodiment of this invention is the additional simplification in cutting and sewing operations this embodiment provides. Because of the common uncut boundary shared by the n-sided polygons comprising the lobes, the number of coincident perimeter panel edges requiring joining (after the panel is folded and the lobes are superimposed in congruent fashion) generally is equal to n−1. Sewing along the entire length of the perimeter of the finished air bag is not required, due to the presence of an intact section of fabric that forms an uncut transition between the respective lobes that become the face and rear panels of the air bag after the panel is folded along an axis coinciding with the common uncut side between the two polygonal lobes and the two lobes are superimposed in congruent fashion. This folding operation causes the respective cut edges of each lobe to coincide, thereby forming a layered, n-sided polygon having only n−1 cut sides. Sewing is required on only the n−1 cut sides of the folded panel, where n is the number of sides in each polygonal lobe. Each reduction in the number of sewn seams reduces the opportunity for rupture along a seam area, and reduces the number of necessary manufacturing steps.

Accordingly, this invention, in each of its embodiments, is believed to represent a useful advancement over the present art.

SUMMARY OF THE INVENTION

In view of the foregoing, it is an object of this invention to provide an air bag that can be formed from fabric panels that are cut from a fabric blank with a minimum amount of wasted fabric. The blank may be of woven or non-woven fabrics, films, or combinations or composites thereof, as may be prescribed by those skilled in the art.

It is another object of this invention to provide a vehicle occupant restraint cushion or air bag that can be formed from two polygonal panels, or from a single panel comprised of two abutting polygonal lobes, without the need for any additional attachments, shape-forming members, or reinforcements to define the surface of the air bag.

It is yet another object of this invention to provide an inflatable restraint cushion that, in one embodiment, is comprised of two congruent polygonal-shaped fabric panels in the shape of the same n-sided equiangular polygon, where n is at least five. The panels are superimposed and aligned in congruent fashion to make the n edges coincident. The edges are then joined along their respective n cut sides by a perimeter seam comprised of a series of easily-sewn or joined straight seams, with no need to fold either of the panels prior to the formation of the perimeter seam, and no need to orient the perimeter seam with respect to any fold line that may be used to facilitate storage of the uninflated air bag in an operative position within the vehicle.

It is still another object of this invention to provide an inflatable restraint cushion that, in another embodiment, is comprised of a single panel of fabric comprised of two congruent polygonal lobes that share a common uncut side. The two polygonal lobes are each in the shape of the same n-sided equiangular polygon, where n is at least five, i.e., each lobe is configured in the shape of a pentagon, hexagon, heptagon, octagon, or the like, each lobe having n−1 cut sides. During assembly of the air bag, the two lobes are folded along an axis coinciding with the uncut n side shared by the two polygons, and superimposed to form a flat, layered, polygonal structure with an aligned, congruent perimeter comprised of n straight sides, of which n−1 are comprised of coincident cut edges. The folded polygonal structure is seamed or otherwise joined together along the n−1 cut sides by sewing or other suitable techniques. Because the shared side of the polygonal structure comprising the $n^{th}$ side is uncut fabric, seaming along this side may be regarded as optional. Although seaming operations usually use sewing, it is contemplated that if coated or other suitable fabrics are used, the coincident cut edges of the two lobes can be welded or otherwise secured together by techniques known to those skilled in the art.

Applicable to both embodiments, it is contemplated that additional layers of fabric or other materials may be interposed or placed alongside one or both of the layers, either fully or partially, as the specific design may dictate. Upon appropriate inflation, the resulting flat cavity will form a restraint cushion or air bag that, when incorporated into an appropriate air bag system, is suitable for protecting the occupants of a vehicle involved in a collision.

In accordance with one aspect of the present invention, a method for forming the inflatable cushion of the present invention from two separate polygon-shaped panels is provided. This method comprises the steps of: (a) cutting from a fabric blank a first fabric panel in a chosen n-sided equiangular polygon shape; (b) cutting from a fabric blank a second fabric panel in a congruent n-sided equiangular polygon shape; (c) superimposing the first and second panels in congruent fashion, thereby forming an n-sided, layered polygonal structure in which the respective n cut sides of each polygon are coincident, and (d) joining or sealing together the coincident cut sides along each of the n sides of the polygonal structure In accordance with another aspect of the present invention, a method for forming the inflatable cushion of the present invention from a single panel is provided. This method comprises the steps of: (a) cutting from a fabric blank a single panel having a dual-lobed shape comprised of a pair of congruent, n-sided equiangular polygons that share a common uncut side, each lobe thereby having the shape of a polygon having n−1 cut sides and an $n^{th}$ uncut side along which it is seamlessly joined to the other lobe; (b) folding this dual-lobed panel along an axis that coincides with the uncut $n^{th}$ side shared by the pair of polygons, thereby forming a layered polygonal structure in which the two polygonal lobes are superimposed in congruent fashion, thereby aligning each of the n−1 cut sides of each lobe with the corresponding cut side of the other lobe to form a perimeter substantially comprised of a layered edge in which the n−1 cut sides are coincident; and (c) forming a perimeter seam along each of the respective n−1 cut sides.

Both the cutting and sealing operations may be achieved by manual, automated, or any other methods known by those skilled in the art. As is conventionally done, suitable holes may be cut in the rear panel or lobe to form gas inlet means, gas vents, or for other purposes. It should be noted that various other structural devices or reinforcements may be incorporated into the design of the air bag which may result in the resulting polygonal structure or cushion having more than two layers.

BRIEF DESCRIPTION OF THE DRAWINGS

These and other features of the invention will become more apparent from the following detailed description of the preferred embodiments of the invention, when read in conjunction with the accompanying drawings in which:

FIG. 1 shows a cut-away view of an inflatable cushion restraint, such as that of the present invention, in deployment between the driver and the steering column.

FIG. 2 shows an arrangement of circular panels on a fabric blank, exemplifying the prior art.

FIG. 3 shows an arrangement of pentagon-shaped panels on a fabric blank in accordance with the teachings herein.

FIG. 4 shows an arrangement of closely adjacent panels, each having the shape of a regular hexagon, on a fabric blank in accordance with the teachings herein.

FIG. 4A shows the panels of FIG. 4 arranged as separate but contiguous panels having coincident sides on a fabric blank in accordance with the teachings herein.

FIG. 4B shows a group of dual-lobed panels, each of which is in the shape of a pair of the hexagons of FIG. 4 that are in abutting relationship along a common side, on a fabric blank in accordance with the teachings herein.

FIG. 5 shows an arrangement of individual panels having at least one side coincident with a contiguous panel, each panel having the shape of an equiangular hexagon, on a fabric blank in accordance with the teachings herein.

FIG. 6 shows an arrangement of closely adjacent panels, each having the shape of a regular octagon, on a fabric blank in accordance with the teachings herein.

FIG. 7 shows an air bag constructed from the panels of FIG. 6.

DETAILED DESCRIPTION

Turning now to the drawings, FIG. 1 shows generally an air bag 10 for use in conjunction with an air bag system comprising an inflator 12 to protect a vehicle driver 14 from impacting against a steering wheel 16 in the event of a collision. The air bag 10 may be stored conventionally, i.e., in folded form within the central column of steering wheel 16, prior to deployment. For purposes of exposition, the panel that faces the driver following inflation shall be referred to as the front or face panel, and the panel that, following deployment, faces the steering wheel of the vehicle shall be referred to as the back or rear panel. As will be appreciated by those of ordinary skill in the art, suitable holes may be cut in the rear panel for the introduction and venting of the inflation media, with the location and size of the inflator and vent holes being determined by conventional design criteria. Furthermore, hub configurations, including size and number of doublers, heat shields, reinforcements, or other features known to those skilled in the art may be used in accordance with conventional teachings.

The air bag 10 preferably is formed from the superposition of a face panel and a congruent rear panel, each of which is shaped in the form of an equiangular polygon, preferably having at least five sides, and more preferably having six or eight sides. This is in contrast to driver's side air bags that are conventionally formed from panels that are circular in shape. As shown in FIG. 2, the use of circular panels results in significant fabric waste because of the limited degree to which a plurality of circular panels 18 can be arranged in close proximity on a fabric blank 20. The fabric blank waste (defined herein as the fabric between the indicated panel cutout areas within fabric blank 20, otherwise referred to as the inter-panel fabric) that is associated with using circular panels results in a significantly higher cost—in excess of ten percent in some cases—for each finished circular air bag. In addition, because each individual panel 18 must be cut separately from the blank 20, an additional cutting efficiency may be gained in the practice of the instant invention, as described below.

The fabric blank 20 may be formed from any material suitable for use in an air bag. Both the cutting and sealing operations may be achieved by manual, automated, or any other methods known by those skilled in the art. As is conventionally done, suitable holes may be cut in the rear panel or lobe to form gas inlet means, gas vents, or for other purposes. It should be noted that various other structural devices or reinforcements may be incorporated into the design of the air bag that may result in the resulting cushion having more than two layers at various locations on the panels.

Potentially preferred materials may include woven fabrics or non-woven fabrics, films, and combinations or composites thereof. Woven fabric constructions of nylon, polyester, or other suitable natural or polymeric materials as are well known to those skilled in the art may be preferred. Fabrics formed from nylon 6,6 have been found to be particularly suitable. The fabrics may be coated or uncoated, and, in connection with one embodiment disclosed herein, the face panel and rear panel each may be cut from a different type of fabric, provided their relative size and shape are in accordance with the teachings herein. By way of example only and not limitation, the face panel may be a coated or very low permeability uncoated fabric while the rear panel is a higher permeability material so as to facilitate venting immediately following inflation.

To form the air bag 10 in accordance with one embodiment of this invention, a face panel and a separate rear panel are inscribed within the area of a suitable fabric blank 20, as shown in FIGS. 3, 4, 4A, 5, or 6. It should be understood that if the face and rear panels are to be made from different fabric materials, separate blanks 20, each comprised of the desired respective fabric, would be used to form multiple face or rear panels, respectively arranged as indicated in the Figures. As can be seen, by forming the panels in the shape of an equiangular polygon, for example, a hexagon as depicted in FIGS. 4, 4A, and 4B, the inter-panel fabric area may be minimized, thereby tending to minimize the fabric in blank 20 that is not incorporated into a panel. In addition to minimizing the amount of such inter-panel fabric, the use of a hexagonal panel shape allows for economies of cutting. If the panels are placed on the fabric blank in contiguous or abutting relation, i.e., with coincident sides or edges, then the cutting of one panel edge serves to cut the edge of the contiguous panel. This feature is depicted in FIGS. 4A and 5, which show, respectively, regular hexagons and equiangular hexagons that individually are in contiguous relation, but this aspect applies to other polygon shapes as well, to the extent their grouped geometry provides for coincident edges.

Following the cutting of two congruent panels that will become the face and rear panels of the fabricated air bag, the two individual panels are superimposed in congruent fashion, so that each of the panels lie flat and their respective cut edges coincide and form a common, flat peripheral edge that can be easily joined without having to accommodate folds, gatherings, or other geometric irregularities in the fabric. The two panels may be joined by seaming slightly inboard of their commonly aligned outer edges using any suitable type of stitching, or being otherwise secured or fused using attachment means along or adjacent to their commonly aligned outer edges, to form an inflatable closed volume capable of use in a vehicle air bag system.

Alternatively, an inflatable cushion may be fabricated from a single panel of fabric in the shape of a pair of abutting congruent n-sided polygons, forming a dual-lobed structure such as depicted in FIG. 4B. In this embodiment, one of the polygonal lobes is folded over onto the opposing polygonal lobe, in clamshell fashion, along the common or shared side 29 between the two polygons comprising the lobes. This forms a two layer structure in which the top panel portion and the bottom panel portion have their respective cut edges or sides aligned, i.e., coincident. These two portions, which ultimately become the face and rear of the air bag, may then be joined along their respective perimeters by being sewn slightly inboard of their commonly aligned outer edges using any suitable kind of stitching, or being otherwise secured or joined using attachment means along or adjacent to their commonly aligned outer edges, to form an inflatable cushion. Stitching or other securing along common or shared side 29 comprising the common boundary between the lobes contains no cut edges and is therefore optional, depending upon the design of the final air bag. It should be noted that, although not shown in the Figures, the embodiment represented by the dual-lobed panel of FIG. 4B can be employed with equiangular n-sided polygon designs such as the equiangular hexagon depicted in FIG. 5, as well as to other regular n-sided polygon designs such as the regular octagon of FIG. 6, provided that the pair of polygons upon which the design is based (1) congruent, (2) abutting (i.e., share a common side) and (3) are mirror images about such shared side, so as to have coincident sides or edges when folded about the shared or common side.

This invention describes panels based upon n-sided congruent polygons, where n is at least five. The various Figures illustrate arrangements of panels based upon pentagons 22 (FIG. 3), hexagons 24, 26, 28 and 30 (FIGS. 4, 4A, 4B and 5), and octagons 32 (FIG. 6), respectively, on a fabric blank 20. As can be easily observed from FIGS. 4, 4A, and 4B, panels 24, 26, and 28 based upon regular hexagons may be most preferred because they can be closely aligned on the fabric blank 20, resulting in the smallest amount of fabric waste per blank, yielding the lowest cost per unit. However, the inter-panel fabric resulting from the use of equiangular hexagons 30 (FIG. 5) and equiangular or regular octagons 32 (FIG. 6) that might otherwise be classified as waste may be relatively easy to utilize in other steps in the fabrication of an air bag as reinforcing panels or other attachments, and therefore may be preferred for certain air bag designs.

Panels based upon polygons having seven, nine, ten, or larger number of sides may be employed, as design configurations dictate. However, it is clear that, generally as the number of sides n increases beyond, say, ten, the more the result tends to resemble a circle, and the advantages of the instant invention become correspondingly diminished. For this reason, n is preferably an integer that is at least five and less than eleven, and is most preferably six or eight.

In accordance with conventional practice, the resulting cushion, made with either the two piece or single piece panel of this invention, may be turned "inside-out" to place the fabric panel edges comprising the seam on the inside of the cushion. It should also be noted that the fabric web from which the air bag panel is to be cut may be oriented with respect to the cutting means in various ways. Orienting a web of an appropriate woven fabric so that the resulting panel axis is at a 45-degree angle to the warp and fill directions of the fabric will give the greatest strength to the inflated air bag. However, it may be desirable to orient the fabric in other ways in order to maximize the number of panels that can be cut from a given web of air bag fabric. Use of panels based on straight-sided polygons, as in the instant invention, offers the additional advantage of aligning one or more of the sides with an edge of the fabric blank, thereby providing the opportunity for a more efficient arrangement of the individual panels on the fabric blank.

Having described the principles of our invention in the form of the foregoing exemplary embodiments, it should be understood by those skilled in the art that the invention can be modified in arrangement and detail without departing from such principles, and that all such modifications falling within the spirit and scope of the following claims are intended to be protected hereunder.

We claim:

1. An inflatable fabric cushion for use in a vehicle occupant restraint system, said cushion having a face side and a rear side, wherein said face side is comprised of a first n-sided equiangular polygon and said rear side is comprised of a second, congruent n-sided polygon, where n is an integer that is at least five and less than eleven.

2. The cushion of claim 1 wherein the numerical value of n is selected from the group consisting of six and eight.

3. The cushion of claim 1 wherein said n-sided polygon is a regular polygon and and the numerical value of n is selected from the group consisting of six and eight.

4. A fabric blank having inscribed therein at least one pair of adjacent and congruent polygon-shaped panels for use in air bag construction, each of said adjacent panels in said pair being comprised of at least one n-sided equiangular polygon, n being an integer that is at least five and less than eleven, wherein one of said polygon-shaped panels comprising said pair of panels has at least one side parallel to a side of said other polygon-shaped panel comprising said pair of panels.

5. The fabric blank of claim 4 wherein the numerical value of n is selected from the group consisting of six and eight.

6. The fabric blank of claim 4 wherein said n-sided polygon is a regular polygon and the numerical value of n is selected from the group consisting of six and eight.

7. The fabric blank of claim 4 wherein each of said panels comprising said pair of panels is a dual-lobed panel having 2n−2 sides in which each lobe is in the shape of said n-sided equiangular polygon, where n is an integer that is at least five and less than eleven.

8. A process for manufacturing an inflatable restraint cushion, said process comprising the steps of: (a) cutting a first n-sided panel in the shape of an equiangular n-sided polygon and a second, congruent n-sided panel from a fabric blank, where n is an integer that is at least five and less than eleven (b) superimposing said first panel and said second panel in congruent fashion, thereby causing said n sides of said first panel and said n sides of said second panel by forming a perimeter seam along each of their respective coincident n sides.

9. The process of claim 8 wherein the numerical value of n is selected from the group consisting of six and eight.

10. The process of claim 8 wherein said first panel and said second panel are cut from different fabric blanks.

11. The process of claim 8 wherein said pattern for said first panel and said pattern for said second panel are arranged on said fabric blank so that at least one of said n sides of said first panel and at least one of said n sides of said second panel are closely adjacent to each other and are substantially parallel.

12. The process of claim 8 wherein said pattern for said first panel and said pattern for said second panel are arranged on said fabric blank so that at least one of said n sides of said first panel and at least one of said n sides of said second panel are coincident.

* * * * *